United States Patent [19]
John, Jr.

[11] 4,181,008
[45] Jan. 1, 1980

[54] METHOD OF ASSURING NUCLEAR FUEL ROD PRESSURIZATION DURING MANUFACTURE

[75] Inventor: Clarence D. John, Jr., Penn Hills, Pa.

[73] Assignee: Westinghouse Electric Corp., Pittsburgh, Pa.

[21] Appl. No.: 907,215

[22] Filed: May 18, 1978

[51] Int. Cl.² ............................................. G01M 3/32
[52] U.S. Cl. ........................................ 73/52; 73/49.3; 176/19 LD
[58] Field of Search .......................... 73/49.3, 52, 714; 176/19 LD, 19 R

[56] References Cited
U.S. PATENT DOCUMENTS

| | | | |
|---|---|---|---|
| 3,504,528 | 4/1970 | Weinberg et al. | 73/49.3 |
| 3,818,752 | 6/1974 | Lindebeeg | 73/52 |

*Primary Examiner*—Donald O. Woodiel
*Attorney, Agent, or Firm*—J. R. Campbell; Z. L. Dermer

[57] ABSTRACT

A method for determining and assuring that the pressure charged in a fuel rod is retained therein after the rod is sealed by welding a hole closed in the fuel rod end plug. The fuel rod end having the open end plug therein is sealed in a plenum chamber of known volume. A helium source then charges a first chamber to a predetermined pressure, and after isolating the helium source, the first chamber is discharged into the plenum chamber and the fuel rod. If a pressure sensor in the system indicates a relatively high reading, the end plug has not permitted gas to pass into the fuel rod. A relatively low reading indicates that the fuel rod has been pressurized and the hole in the end plug is then welded shut. To verify that the end plug is properly sealed, the plenum chamber is vented to a third chamber of known volume and the system pressure is then determined. If such pressure reaches a predetermined high value, the end plug weld is defective. A relatively low reading indicates that the integrity of the seal weld is sound.

5 Claims, 1 Drawing Figure

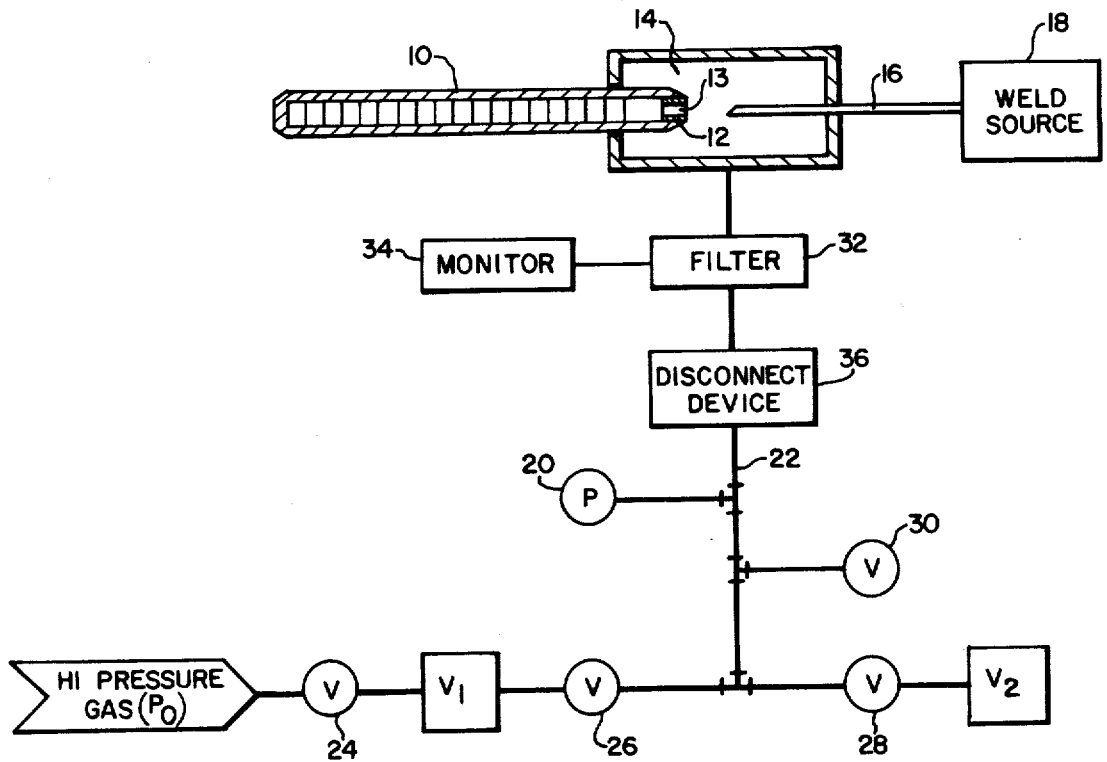

METHOD OF ASSURING NUCLEAR FUEL ROD PRESSURIZATION DURING MANUFACTURE

CROSS-REFERENCE TO RELATED APPLICATION

U.S. Patent Application Ser. No. 831,460, filed Sept. 8, 1977 in the name of William J. Jones, entitled METHOD FOR VERIFYING THE PRESSURE IN A NUCLEAR REACTOR FUEL ROD and assigned to the same assignee as the present invention.

BACKGROUND OF THE INVENTION

The invention described herein relates to fuel rods for nuclear reactors and more particularly to a method of assuring that the fuel rods are charged with a gas to a certain predetermined pressure.

In the manufacture of fuel rods for nuclear reactors, a fuel tube of zircoloy, stainless steel or other material having a diameter of about 5/8 inch and ranging in length to about 14 feet, is loaded with nuclear fuel pellets and subsequently charged with a helium or other inert gas prior to welding one or both end plugs in opposite ends of the fuel rod. Since the fuel rods must be welded shut to prevent leakage of gas therefrom during subsequent operation in a reactor, present quality assurance methods for determining whether the fuel rods are sealed consist of testing on a sampling basis. Sampling of about 2%–10% of a total inventory of fuel rods is done randomly and consists of drilling through the seal weld or the end plug in the end of the fuel rod, measuring the rod pressure, then repressurizing and resealing each fuel rod as disclosed in the above Jones patent application.

The disadvantages of this technique are that such sampling does not provide complete assurance that one hundred percent of the fuel rods have been properly pressurized and sealed. The causes which give rise to defective rods are that the end plug may not contain an axially disposed hole or passage drilled completely through the end plug, or if present, it may unknowingly be plugged, thus precluding introduction of gas into the rod. In the event the end plug hole is open, in carrying out the process of welding the hole shut, the welder may for some reason fail to seal the vent hole, thus allowing gas inside the rod to escape. Also, the pressure sensor used for detecting pressure in the charging chambers may malfunction and thus fail to detect instances when a fuel rod is not initially charged with helium gas. Therefore, in the absence of manufacturing procedures which assure that all fuel rods are tested for continuity and integrity after pressurization, it appears evident that the above factors will result in some fuel rods not being pressurized or sealed.

SUMMARY OF THE INVENTION

The above disadvantages of the prior art are overcome in accordance with the teachings of this invention by providing for one hundred percent inspection of all fuel rods and obtaining a corresponding assurance that all manufactured fuel rods have been pressurized to the requisite level. This is accomplished by connecting the fuel rod internal volume to a weld plenum chamber of known volume which in turn is connected to a first pressure chamber, and the pressure in this system is then determined. The fuel rod is then pressurized to a preset level which is verified, and the end plug hole is then welded shut. Verification that the seal weld in the end plug is proper is obtained by venting the weld plenum chamber to a third chamber of known volume and detecting the pressure therein. Interlocks and pressure sensors of well-known design are used to sound alarms and indicate conditions for out-of-specification situations.

BRIEF DESCRIPTION OF THE DRAWING

The subject matter of the invention is particularly pointed out and distinctly claimed in the concluding portion of this specification. The invention, however, both as to organization and method of operation may best be understood by reference to the following description taken in connection with the accompanying drawing in which:

The single FIGURE in the drawing illustrates a system for accurately determining whether a fuel rod has been properly charged with a gas and a hole in an end plug in the end of the rod sealed to contain the charged gas in the fuel rod.

Referring now to the drawing, there is shown a zircoloy, stainless steel or other fuel rod 10 of the conventional type used in commercial nuclear reactors having end plugs 12 welded in opposite ends thereof and filled with an exact quantity of nuclear fuel pellets. One of the end plugs is equipped either with an axial or radially extending hole 13 used for charging the fuel rod with a gas. All fuel rods are sequentially delivered to a gas pressurizing station in the manufacturing process, and the end of each fuel rod having a gas-charging hole 13 in the end plug, is sealed in a wall of V plenum chamber 14. The chamber also contains an electrode 16 connected to an energy source 18 for welding the hole 13 shut in the end plug. A pressure sensor 20 in gas pipe 22 detects pressure in the system.

To provide gas to the system, a high pressure gas source $P_0$ of helium, for example, is connected to a first chamber $V_1$ through valve 24 and a second valve 26 serves to isolate the gas pressure source $P_0$ and chamber $V_1$ from the remainder of the system. A second container $V_2$ is connected to the V plenum chamber through valve 28. After the fuel rod 10 is sealed in the wall of V plenum chamber 14, the first step in the process is to charge container $V_1$ with gas from the helium source $P_0$ by opening valve 24 and closing valve 26. The source $P_0$ is then isolated by valve 24 and valve 26 opened to connect $V_1$ to the V plenum chamber 14. Since valve 28 is closed, $V_1$ thereupon discharges into the V plenum chamber and the fuel rod 10. Since the volume of chamber $V_1$ and V plenum are known, if the end plug hole is open, thus providing connection between the fuel rod interior and V plenum, the pressure in the system will be less than if $V_1$ expanded only into V plenum.

To determine by illustration whether the end plug 12 is properly sealed, it is assumed that the volume of chambers $V_1$ and $V_2$ are each 3 in$^3$, V plenum is 1 in$^3$ and $V_{rod}$ is 2 in$^3$. The pressure source $P_0$ is 400 psi. The following relationship between the chambers will therefore exist:

$$V_1 = V_2 = V_{rod} + V \text{ plenum, and } P_1V_1 = P_2V_2 = P_nV_n$$

OPERATION

When the high-pressure source $P_0$ of 400 psi charges chamber $V_1$ of 3 cubic inches, the pressure in $V_1$ will be 400 psi, the product $P_0V_1$ will be:

$$400 \times 3 = 1200 \text{ psi} - \text{in}^3$$

Chamber $V_1$ is then isolated from the pressure source $P_0$ by closing valve 24. $V_1$ is then discharged into V plenum by closing valve 28 and opening valve 26. If the hole 13 in end plug 12 is open, the fuel rod obviously will fill with gas and sensor 20 will provide a direct reading of pressure which equalizes in this part of the system. The following system pressure readings will provide a direct indication whether the end plug hole is plugged (not open) or open (through hole).

(1) End plug hole is not open:

When $V_1$ discharges into the V plenum chamber, if the hole is not completely drilled axially through the end plug, or if a stoppage in the hole 13 precludes flow of gas into the fuel rod, the system pressure will be high because only chambers $V_1$ and V plenum contain the system pressure, as shown by the following equation:

$$P_0 V_1 = P(V_1 + V \text{ plenum})$$

$$1200 = P(3 + 1)$$

$$P = 400 \text{ psi}$$

This relatively high reading of 400 psi clearly indicates to an operator that the end plug hole is either not completely drilled or the hole is drilled but plugged. Under these conditions, the fuel rod is removed from the V plenum chamber for drilling or other action.

(2) End plug hole open:

When $V_1$ discharges into V plenum and the fuel rod because of the open hole, the system pressure will obviously be lower than the preceding condition wherein the end plug hole was closed, as follows:

$$P_0 V_1 = P(V_1 + V \text{ plenum} + V_{rod})$$

$$1200 = P(3 + 1 + 2)$$

$$P = 200 \text{ psi}$$

This relatively low pressure sensor reading indicates the end plug hole 13 is open, and that the fuel rod has been charged with helium from source $P_0$. Under these conditions, the gas environment in the chambers is maintained and the hole 13 is then welded shut by energizing the weld source 18.

The next step in the process is to make certain that the end plug hole 13 has been properly welded shut and will be capable of holding gas in the fuel rod under all subsequent conditions of operation. After welding, valve 26 is closed and valve 28 opened to allow gas in the system to be discharged into chamber $V_2$. If the plug hole 13 has properly been welded shut, the resulting system pressure will be greater than that which will exist under circumstances of a defective weld.

(3) End plug hole sealed shut:

$$P_0 V_{plenum} = P(V \text{ plenum} + V_2)$$

$$400 \times 1 = 400 = P(1 + 3)$$

$$P = 100 \text{ psi}$$

When an operator observes this relatively low reading, it is clear that welding of the hole has been effective and that the fuel rod has been properly sealed. The system is then vented of gas through valve 30 and the fuel rod removed from the plenum chamber for further processing in the manufacturing cycle.

(4) End plug hole not sealed shut:

$$P_0(V_{rod} + V_{plenum}) = P(V \text{ plenum} + V_{rod} + V_2)$$

$$400(2 + 1) = P(1 + 2 + 3)$$

$$P = 200 \text{ psi}$$

This relatively high reading of 200 psi indicates that sealing of the end plug hole is defective, thus requiring removal of the fuel rod to a repair area where appropriate steps can be taken to restore the fuel rod to a condition which permits rewelding of the end plug hole 13.

Although the above method for determining weld integrity excludes chamber $V_1$ in the system, it will be evident it may be included if desired and still arrive at representative system pressures which indicate whether the weld has been properly made.

Thus, by observing pressure sensor 20, an operator can determine directly whether the hole in an end plug permits charging the fuel rod with gas, and if so, whether after welding, system pressure shows that gas has been effectively sealed in the fuel rod.

At the conclusion of testing, the system pressure is vented to the atmosphere through vent valve 30. If products resulting from the welding operation adversely contaminate the gas, appropriate filters may be used to return it to a clean state.

The major benefit derived from carrying out the above-described method is that only one additional step need be taken in the present fuel rod manufacturing process to achieve testing of one hundred percent of the fuel rods. Each fuel rod is not diverted, removed or otherwise changed from the normal process flow of fuel rods in the manufacturing cycle or system because each fuel rod must be charged with a gas, and it must therefore be delivered to and sealed in a plenum chamber which receives gas prior to flowing into the fuel rod. Welding equipment also is presently needed to weld the end plug hole shut after gas-charging takes place. All of the same steps are still performed in the same way and by the same equipment. The only additional equipment needed in carrying out this invention is two chambers ($V_1$ and $V_2$) and two valves (26, 28). The additional time involved is only those few seconds needed by an operator to observe the pressure sensor 20 during the time of charging chamber V plenum, in operating valves 24, 26, and again observing the sensor to determine whether weld integrity has been achieved.

The above-described system also will be used for sealing fuel rods having pellets of plutonium, uranium-thorium, and the like. After a fuel rod is pressurized and the welding process completed, the V plenum chamber is discharged to $V_2$, all as described above. In the event the hole 13 in the end plug 12 is not welded shut, solid radioactive particles of plutonium or other fuel used, may be carried from the fuel rod into V plenum chamber and chamber $V_2$ when helium is vented into $V_2$. These minute particles can contaminate the system to the point where all fuel rods tested may exhibit some degree of radiation. To preclude this condition from occurring, a filter 32 is placed in line 22 and includes characteristics such that it will absorb or trap any radioactive particles and prevent them reaching chambers $V_1$ or $V_2$, or being vented to the atmosphere via valve 30. The radioactive condition of filter 32 is both monitored and detected by a conventional radiation monitor 34.

In the event the monitor 34 indicates that the filter 32 should be removed from the system, a quick disconnect device 36 installed in line 22 is actuated to remove the filter and/or V plenum chamber from the system.

It will be apparent that many modifications and variations are possible in light of the above teachings. It therefore is to be understood that within the scope of the appended claims, the invention will be practiced other than as specifically described.

What is claimed is:

1. A method of determining whether a nuclear reactor fuel rod is charged with a gas comprising the steps of:
    inserting an end of a fuel rod loaded with nuclear pellets in a plenum chamber of known volume, said fuel rod being sealed at one end and having an end plug in the other end equipped with an opening which establishes communication between the plenum chamber and the interior of the fuel rod;
    temporarily sealing said rod in the walls of said chamber;
    charging a first container of known volume with an inert gas from a high-pressure source and then isolating said first chamber from said source;
    discharging gas from said first container into the plenum chamber and from the plenum chamber through said end plug opening and into the interior of said fuel rod; and,
    observing a pressure sensor connected to the system which according to the equation $P_1V_1 = P_2V_2 = -P_nV_n$ will indicate either a high or low reading according to whether the fuel rod has been charged with gas from the plenum chamber;
    closing the hole in said end plug by a weld in the event the sensor displays the lower of two readings; and,
    removing said fuel rod from the plenum chamber in the event said sensor displays the higher of two readings.

2. The method according to claim 1 including the step of determining whether the opening in said fuel rod end plug is welded shut by discharging gas from said plenum chamber to a second chamber;
    detecting the level of pressure in said second chamber, said pressure level being at a relatively lower level in the event the end plug opening is welded shut, and being at a higher level in the event it is not welded shut; and,
    venting gases from the system and removing said fuel rod from the plenum chamber when the pressure sensor displays the lesser of said two values.

3. The method according to claim 2 wherein said end plug opening is rewelded in the event said pressure sensor displays the greater of said readings.

4. The method according to claim 1 wherein the radiation level of radioactive particles in the system is constantly monitored during the step of determining whether the opening in said end plug is closed by the welding process.

5. The method according to claim 1 wherein a filter in the system absorbs and traps any radioactive particles therein during the step of determining whether the opening in said end plug has been welded closed;
    monitoring the level of radiation of said radioactive particles; and,
    removing said plenum chamber and filter from the system in the event the level of radiation reaches a predetermined high value.

* * * * *